United States Patent
Steck

(10) Patent No.: US 9,742,831 B2
(45) Date of Patent: Aug. 22, 2017

(54) MODULAR AND SCALABLE DIGITAL MULTIMEDIA MIXER

(71) Applicant: Randy Steck, Hillsboro, OR (US)

(72) Inventor: Randy Steck, Hillsboro, OR (US)

( * ) Notice: Subject to any disclaimer, the term of this patent is extended or adjusted under 35 U.S.C. 154(b) by 0 days.

(21) Appl. No.: 15/040,299

(22) Filed: Feb. 10, 2016

(65) Prior Publication Data

US 2016/0173554 A1 Jun. 16, 2016

Related U.S. Application Data

(63) Continuation of application No. 14/268,872, filed on May 2, 2014, now abandoned.

(60) Provisional application No. 61/822,244, filed on May 10, 2013.

(51) Int. Cl.
| | |
|---|---|
| *G06F 13/38* | (2006.01) |
| *H04H 60/04* | (2008.01) |
| *H04N 21/43* | (2011.01) |
| *H04N 21/4402* | (2011.01) |
| *H04L 29/06* | (2006.01) |
| *H04L 29/08* | (2006.01) |
| *H04N 21/434* | (2011.01) |

(52) U.S. Cl.
CPC .......... *H04L 65/604* (2013.01); *G06F 13/385* (2013.01); *H04L 63/102* (2013.01); *H04L 65/605* (2013.01); *H04L 67/025* (2013.01); *H04H 60/04* (2013.01); *H04L 63/083* (2013.01); *H04N 21/4305* (2013.01); *H04N 21/4347* (2013.01); *H04N 21/440245* (2013.01)

(58) Field of Classification Search
CPC ............. H04N 21/2146; H04N 21/232; H04N 21/6405
See application file for complete search history.

(56) References Cited

U.S. PATENT DOCUMENTS

| | | | | |
|---|---|---|---|---|
| 6,014,381 A | * | 1/2000 | Troxel | H04L 12/40058 348/E7.05 |
| 6,289,376 B1 | * | 9/2001 | Taylor | H04N 21/2182 709/203 |
| 2002/0062306 A1 | * | 5/2002 | Perrone | G06F 17/30867 |

* cited by examiner

*Primary Examiner* — Michael Teitelbaum
(74) *Attorney, Agent, or Firm* — patenttm.us

(57) ABSTRACT

A modular multimedia platform includes a chassis into which a variety of modular input/output units, referred to as ports, may be inserted. The units may acquire an input signal and convert it to high precision digital information, or convert a digital signal to an analog signal and output the analog signal (or digital output may be provided). Multiple chassis can be connected together to increase the number of ports. A tag unit may be attached to any device coupled to a port. Each tag has a unique identification number to uniquely identify the device to which it is attached.

23 Claims, 5 Drawing Sheets

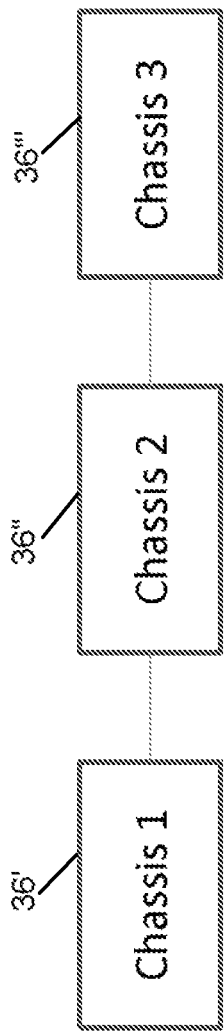
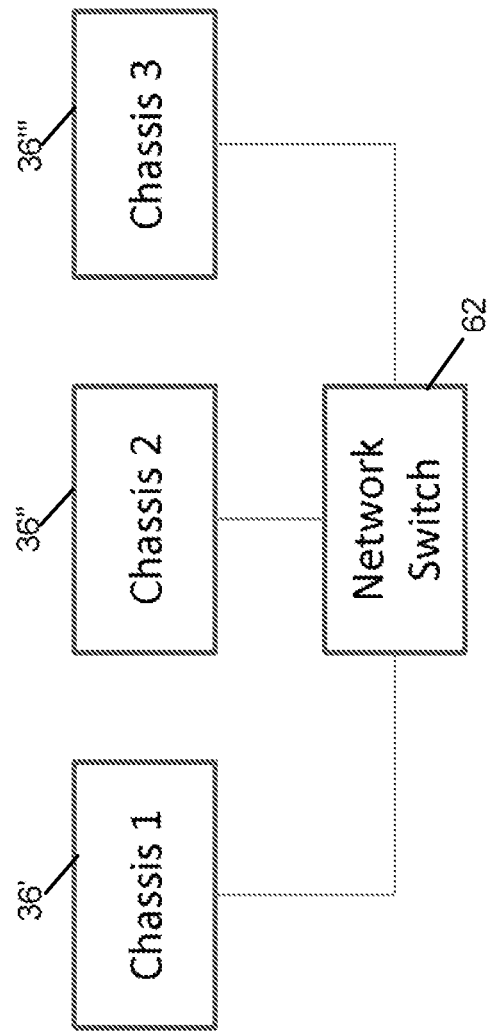

MODULAR AND SCALABLE DIGITAL MULTIMEDIA MIXER

CROSS-REFERENCE TO RELATED APPLICATIONS

This application is a continuation of U.S. patent application Ser. No. 14/268,872 filed May 2, 2014, which claims priority from U.S. provisional patent application Ser. 61/882,244, filed May 10, 2013. The disclosures of these applications are hereby incorporated by reference.

BACKGROUND

This disclosure relates to audio/video systems, and more particularly to a modular and scalable digital audio/video/lighting platform.

Live performance sound, video and lighting reinforcement has followed the basic conventions and configurations established in the early days of audio electronics using microphones, pickups, speakers and a central mixer and amplifier. Advanced technologies have largely been applied to this system within particular pieces of equipment (digital mixers using signal processing techniques) or to reduce the bulk or size of interconnections (digital snakes). This point by point application of technology has significantly complicated the tasks of sound engineers in setting up and managing live performance systems since few of the systems are integrated in either control or data transport, thus requiring extensive mapping and cumbersome custom setups.

Video and lighting displays also provide a component of presentations, requiring sophisticated control and coordination of all the components to provide an improved performance or presentation.

Embodiments of the system described herein vastly simplify audio/visual/lighting systems in both deployment and usage through the unique application of available technologies. Embodiments of the system result in high quality sound/video/lighting, less expensive equipment, better failure recovery, simplified equipment configuration and setup, configuration backup/restore, and access to advanced audio/video/lighting capabilities for even the novice user. All audio/video/lighting capabilities are integrated into one system which controls signal acquisition routing, conditioning, enhancement, combination and output. The embodiments interoperate with existing equipment to minimize expense and lower entry costs, while integrating advanced usability and deployment features.

SUMMARY

In accordance with the disclosure, embodiments of the system consist of a chassis into which a variety of modular units may be inserted. The modular units are input/output units which either acquire an input signal converting it to high precision digital information, or output an analog signal after converting from said digital format. These units are called "Ports". A port can be an input port, and output port, or an input/output port depending on the embodiment of the system.

Accordingly, it is an advantage of the present disclosure to provide an improved modular and scalable platform for multi-media.

It is a further advantage of the present disclosure to provide an improved modular and scalable audio platform system.

It is yet another advantage of the present disclosure to provide an improved modular and scalable video platform system.

It is yet another advantage of the present disclosure to provide an improved modular and scalable lighting control system.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

BRIEF DESCRIPTION OF THE DRAWINGS

FIGS. 3A and 3B illustrates an embodiment of multiple chassis and possible interconnections thereof.

DETAILED DESCRIPTION

The system according to a preferred embodiment of the present disclosure comprises a modular and scalable platform system.

Figure 1:
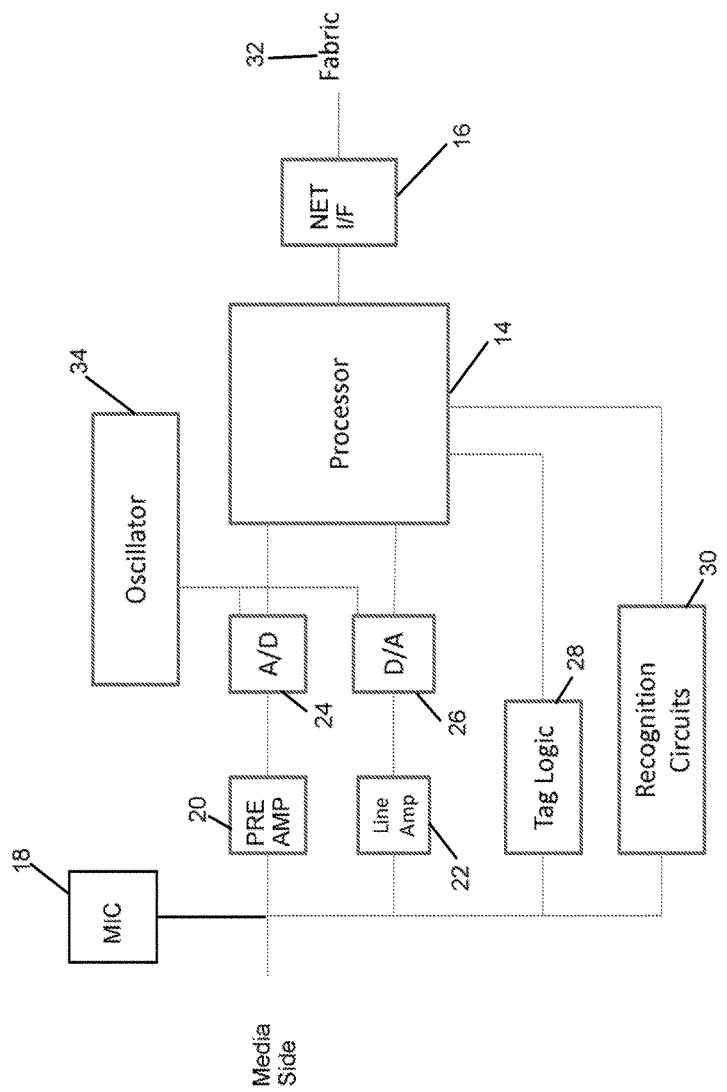
FIG. 1 illustrates an embodiment of a port in accordance with the disclosure.
Figure 2:
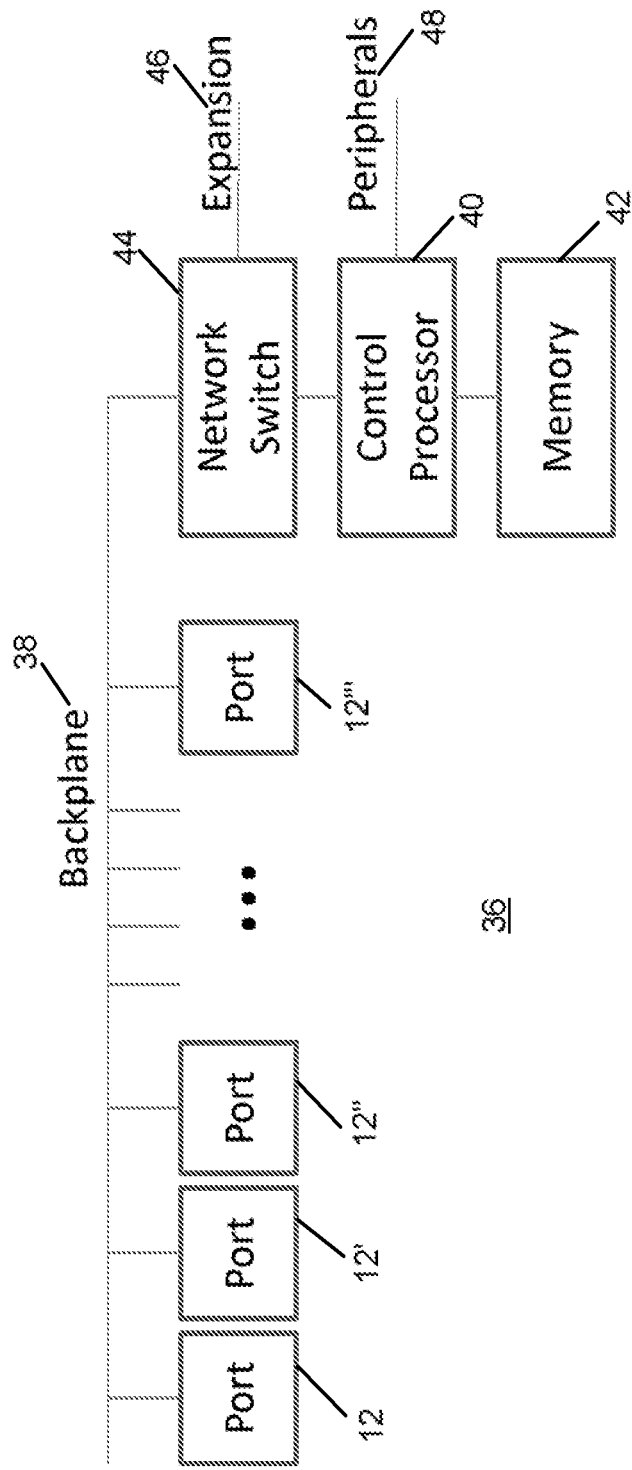
FIG. 2 illustrates an embodiment of a chassis in accordance with the disclosure.

With reference to FIG. 1, a block diagram of an exemplary port and FIG. 2, a block diagram of an example chassis, a port 12 includes a microprocessor 14 and network interface 16 (NET I/F), and in most embodiments external microphone 18 and line level connections such as preamp 20, line amp 22 and both an Analog to Digital converter (A/D) 24 and a Digital to Analog converter (D/A) 26. Tag logic 28, discussed herein below with reference to FIG. 4 also interfaces with the media input side.

Recognition circuits 30 are provided to identify new equipment that is attached to a port.

Alerts may be generated by monitoring incoming signals for certain events, discussed herein.

An oscillator 34 may be provided for providing timing signals for operation of the device.

The function of the port is to acquire an audio, visual, lighting or other signals, process the information through audio or other filter(s), effects, and transport the signals or modified signals through the network interface, or to obtain information from the network interface, process it and output it through a D/A conversion.

The preamp 20 is operable to increase the gain of the incoming (typically) analog signal, whether audio or other type. The preamplifier increases the voltage of the incoming signal to a level matching the maximum range of the D/A device with little to no noise injection. The preamplifier may incorporate variable gain control to balance the incoming signal under operator control.

As illustrated in FIGS. 1 and 2, each port connects to an Ethernet switch fabric 32 embedded in the chassis. FIG. 2 illustrates a chassis 36 that provides a physical framework for a package of electronics to be attached to a backplane 38. The package of electronics, called ports, as illustrated in FIG. 1, sample incoming audio/video/lighting or other data and create a stream of digital information representing the audio information, a D/A converter to convert a digital stream to outgoing audio, a microprocessor or microcontroller, memory, and a network connection (interfaced via network switch 44 to, for example, an Ethernet 46 or other expansion). Also included in the chassis is control processor 40 which receives direction from the operator, directs signal routing, specifies enhancements, filters, and effects, and maintains other system functions. The control processor may interface with one or more peripherals 48. The chassis 36 can contain as few as one port 12, or multiple ports 12, 12', 12", etc. and as many as a particular chassis embodiment will allow. Ports can therefore be added or removed on an individual basis. The chassis may also include memory 42.

An acquired digital audio/video/lighting stream may be modified in the port by many different functions, including but not limited to: gain control, gating filters, limiting filters, audio volume compression, audio volume expansion, equalization, or pitch changing, video effects, lighting effects, etc. In addition, a port may assist an operator by recognizing faulty signal conditions (via recognition circuits 30) and issuing an alert to the control processor.

Alerts include, but may not be limited to: crackle recognition, reduced volume, excessive volume, excessive noise, or an inactive microphone, video signal issues, lighting control issues, or the like. In an audio context, crackle recognition is performed by recognizing the slew rate of an incoming signal that is out of the range of normal audio characteristics. Software running on the processor in the port recognizes excessive transitions of the incoming signal and alerts the operator through the console interface that an abnormal condition exists. An alert remains active until the operator clears it from the system, or until the problem is recognized as having been resolved.

Figure 5:
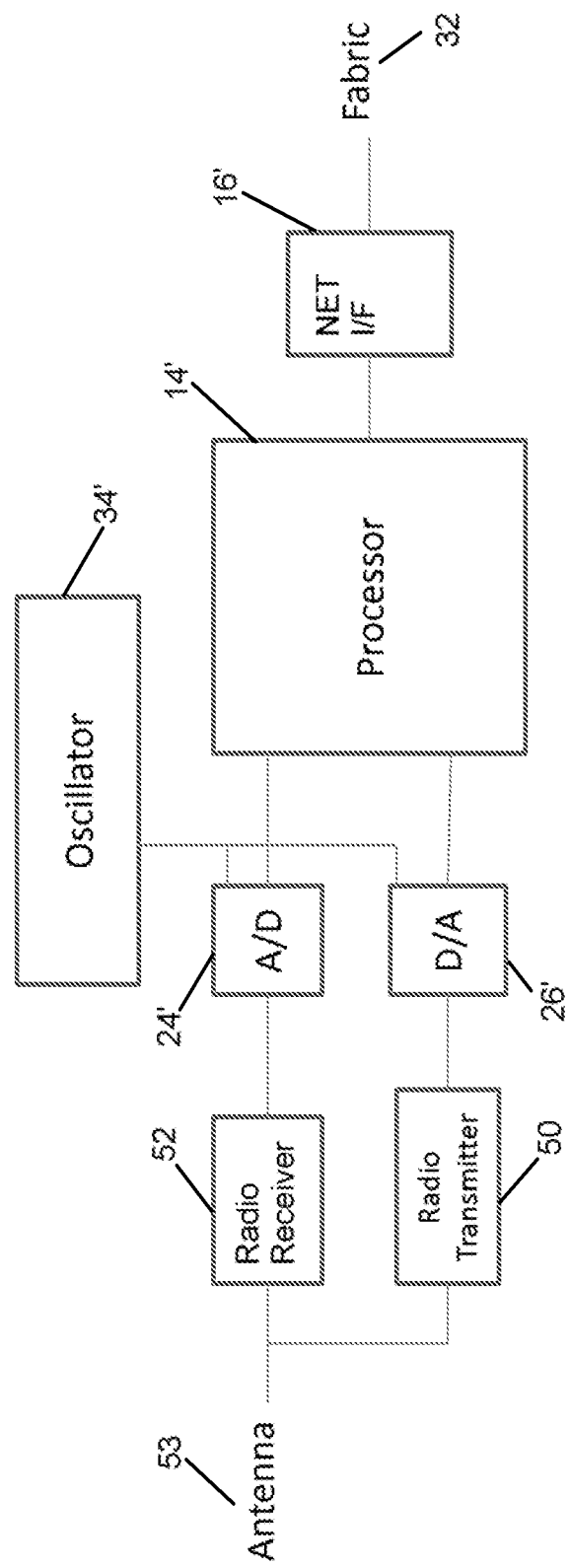
FIG. 5 illustrates an embodiment of an RF port in accordance with the disclosure.

In some embodiments, as illustrated in FIG. 5, a block diagram of an RF port, a port may contain radio frequency transmitters 50 or receivers 52 over which information may be sent or acquired, via antenna 53. A port may also provide network connections to the switch fabric, either directly or through another switch fabric.

A port may allow external connections to MIDI devices, USB, eSATA or any number of other standard interfaces. In all of these cases, the embedded microprocessor or controller may condition or process the signals for switch fabric connection following direction from the control processor.

In the Port, a captured audio or other stream is apportioned to fixed size packets which are then transmitted through the network connection to other devices on the same network through an Ethernet network switch fabric. The destination of the packet stream is directed to one or many different other Ports or devices.

In one embodiment, a timestamp is attached to each created digital stream as it is apportioned to packets. The timestamp value is taken from a sample clock timer which is unique to each Port.

In one embodiment, every sample clock timer in each Port is synchronized to a master timer on the network. The master timer is specified at system power up and communicates with each endpoint device, including each Port, to initialize the sample clock and then periodically send updates and correction values so that each port maintains a sample clock in close synchronization with the master timer.

Each Port includes an oscillator that provides a frequency input to both the A/D and the D/A. The oscillator has a nominal frequency output with deviations from this frequency controlled by means of a pulse width modulated signal from a microprocessor in the port.

Recognition

A port may contain circuitry 30 that allows the system to recognize the type of equipment that is attached to the system. Each port, under control of a microprocessor (the content processor) may monitor the electrical characteristics of equipment attached to the port. When first connected, the content processor may attempt to identify the attached equipment by measuring its electrical characteristics such as resistance and impedance. Each type of equipment can be characterized in advance allowing the creation of a catalog of devices and their characteristics. Through the use of the recognition circuitry, the content processor may identify the attached equipment or device to report it to the control processor of the chassis.

Normally the first such test is a simple resistance. This may be followed by the injection of a signal or signals of various frequencies to determine impedance. Other types of tests may also be done, such as a simple continuity test for presence or absence of voltage. Once the characteristics of the device have been determined, the content processor may find the closest match and identify the probable device to the control processor to be confirmed by the user.

Alerts

Alerts are notifications to the user that a piece of equipment attached to the system may have either degraded functionality or have failed. For instance, a "crackle" alert may be generated as the content processor monitors the incoming signal for integrity and discovers that the signal has a very high and repeated slew rate at particular frequencies. This may indicate that the electrical connection to the equipment is faulty and shorting or opening up causing aberrant audio. "Loss of Signal" is another situation that may be identified when the input has been inactive for a period of time, typically at least a second. Alerts for audio signals may consist of "Crackle", "Loss of Signal", "Degraded Signal", or "Volume Shift" among other integrity issues. Alerts for Video signals may include "Loss of Connection", "Noise", or other conditions. Alerts for lighting connections may include "Loss of Connection", "Loss of Response", "Broken Chain", or other common failure conditions.

Sync

Control of the A/D and D/A oscillator deviation may be derived from an accumulated number of audio/video/lighting/other samples in comparison to other Ports in the system. If the number of samples transmitted by a particular Port is lower than required to maintain a specified number of queued samples, the frequency of the oscillator is increased, first to allow the queue to fill and then to maintain a constant queue depth. Likewise, if the number of samples transmitted by a particular Port is higher than required to maintain a specified number of queued samples, the frequency of the oscillator is decreased, first to allow the queue to empty to the proper level and then to maintain a constant queue depth.

Alternatively, modifications to the sample oscillator frequency may be made by calculating the number of samples transmitted over a period of time, and adjusting the oscillator frequency by a proportional error signal to reach a predetermined rate as calculated by the number of sample per period of time of the synchronized sample timer.

If the rate at which samples are converted by a the D/A converter of a port is slower than that of other port nodes, the D/A oscillator frequency may be increased by a proportional error signal calculation to meet a required rate. Similarly, if the rate at which samples are converted by the port's D/A converter is faster than that of other Ports, the oscillator frequency is decreased by a proportional error signal calculation to meet a required rate. Oscillator frequency adjustments are done continually and on a regular basis during operation of the system.

Each port synchronizes its internal clock with the control processor clock, in one embodiment, using the Ethernet Audio Visual Bridging (AVB) protocol, specified in IEEE 802.11, IEEE 1588. Communication channels (listeners and talkers) are assigned and modified by the control processor as specified by input received from the operator.

Each port may receive one or many audio/video/lighting/other data streams from other ports. The port queues these streams and applies filters, effects, and controls as directed by a system controller. This processing may consist of mixing functions, frequency equalization, audio reverberation, echo, delays, or any of a wide range of audio/video/lighting/other processing functions. All specified input streams after processing become an output stream unique to that port's outputs.

FIGS. 3A and 3B illustrate that multiple chassis can be connected together to increase the number of available ports. This connection is done through the switching fabric and with standard network interfaces. When multiple chassis are connected, control processors in each chassis synchronize configuration and control functions with control processors in all other chassis. In FIG. 3A, multiple chassis 36', 36", 36''' connect directly to one another in serial fashion. In FIG. 3B, the multiple chassis 36', 36", 36''' connect to network switch 62.

Tags

Figure 4:
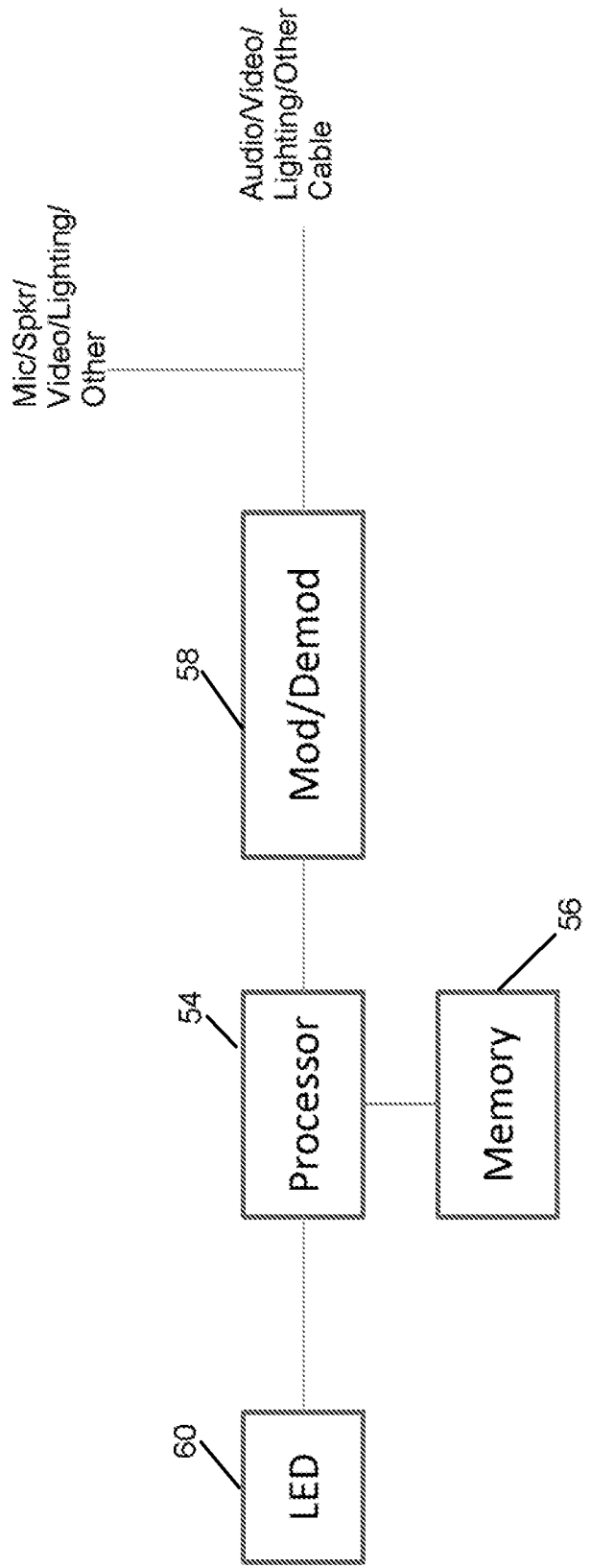
FIG. 4 illustrates an embodiment of a tag in accordance with the disclosure.

With reference to FIG. 4, a block diagram of a tag, a tag may be attached to any connected device (microphone, speaker, lights, etc.), in one embodiment. The tag 28 consists of an electronics package that communicates with the port through the connection that the device to which it is attached uses, for example configured as a small coupler that is inserted between the device and the connecting wire. A tag may comprise a processor 54 with memory 56, attached to modulator/demodulator 58 (Mod/Demod). The mod/demod interfaces with a microphone, speaker, camera or other input device and/or an audio/video/other input cable. An LED 60 or other indicator may be provided for operational feedback to the user or technician to communication the state or operational function of the tag. The tag is used to uniquely identify the equipment to which it is attached and each tag has a unique ID number. In addition, in other embodiments, other information may be stored on the tag in non-volatile memory which may otherwise describe functions or characteristics of the attached device, such as attributes of the attached device, unique identifiers, or system configuration information. The tag information may be updated in the tag through the connection to the port and under command of the control processor as prescribed by the operator.

The tag communicates with the port by multiplexing digital information. In one embodiment, frequency multiplexing of digital information is performed at a frequency outside, for example, above, the audio frequency spectrum (in an audio system usage configuration). Digital information may be sent from the Port to the Tag or from the Tag to the Port and is modulated at the sender and demodulated at the receiver. The transmitted information may contain either data or control commands for Tag functions.

The tag begins operation upon application of "phantom power" to the audio connection. Phantom power is an industry standard of 48V used for operation of specific types of microphones and associated circuitry. Once power is applied, the tag enables its receive circuitry and waits to be polled by the system. The system may send a query across the audio cable that is received and decoded by the tag circuitry. This query is encoded as bursts of frequencies above the audio spectrum. These bursts are recognized by the receiving circuitry as a series of "1" and "0", forming codes for various commands and data to be transferred. The preferred implementation is to use data as normally formatted by a UART with a start bit, data bits, followed by parity and stop bits. The preferred operation is to encode a "0" as a frequency burst of about 120 KHz, with a "1" represented by the absence of frequency. Data is transferred at a rate that accommodates the length and type of cable, and may range anywhere from 110 bits/second to above 115,000 bits/second.

Information is normally sent across the audio cable as a differential signal imposed on the phantom power/audio lines in a typical microphone cable. Thus, both the positive and negative versions of a frequency burst are sent for increased reliability. However, some installations may use a single-ended signaling method that is imposed only on one of the signal lines, as might be necessary when attached through a conductor that includes only a signal and ground connection.

Frequencies for data transmission come from a standard oscillator circuit. That signal is driven onto a signal line through capacitive coupling gated by the data signal. In the presence of a "0" the signal is enabled onto the audio cable connection. Reception is accomplished by capacitive coupling from the audio line to a Phase-Locked Loop (PLL), which detects the signaling frequency and transforms it back into a string of "1" and "0".

Circuitry in the tag receives data words by decoding frequency bursts and recognizing data words. Upon receipt of a query or command from the system, the tag performs certain actions. The tag may also transmit information using the same method used to receive information. It uses this capability to respond to queries and commands received from the system. The minimum time between the time from a command to a response is the time of the minimum number of stop bits required in that particular system.

Each command/query is encoded as a single byte of data. Below is a list of actions and responses that the tag may use:

| Query/Command | Response | Description and action |
|---|---|---|
| Present | Acknowledge | The system sends the "present" query to determine if a tag is present on that line. If it is present, the tag responds with a message that indicates that it is present. |
| SendID | ID | The system commands the tag to send its unique ID back to the system. In response, the tag transmits its unique identification code in one or several bytes of data |
| SendCFG | Byte count and Configuration | The system commands the tag to send any configuration information it contains back to the system. Configuration information is unique to each attached device and may consist of many bytes of data. The tag responds by sending the number of bytes that will |

-continued

| Query/Command | Response | Description and action |
|---|---|---|
| | | be transmitted, followed by the configuration in that number of bytes. |
| UpdateID | ACK/NACK | The system can change the unique ID of the tab by sending the command UpdateID, followed by the new unique ID in one or several bytes. Once received, the tag sends a response to the system acknowledging successful receipt and update. If the information was not received or failed to store, the tag sends a NACK (negative acknowledement) |
| UpdateCFG | ACK/NACK | The system may change the configuration information stored in the tab by sending the UpdateCFG command. The command is followed by a count of the number of bytes to be transmitted, followed by the new configuration information. The tag responds with an ACK if successfully updated and a NACK if not. |
| Indicator | | The system may command the tag to show a variety of indications on status lights or displays, such as ON, OFF, COLOR, FLASH, etc. The system sends the Indicator command followed by data indicating the expected display. |
| Other | | Other commands or queries may be added as necessary to support specific types of equipment. |

Apps

Application Programs (Apps) can be installed on one or all of the control processors in a system. Apps may be associated with specific hardware attached to the system to perform functions or operations. Most commonly, Apps will be delivered in conjunction with attached ports as new modules or ports are attached to the system. These Apps may consist of user interfaces to particular hardware, programs that operate on the data flowing through the system, or programs that analyze the data flowing through the system for further control functions.

An App is presented to the user through the console interface, and the user may initiate the App to perform a particular function, such as a video switching system. An App may also initiate other Apps which may contain programs or functions that it uses to perform its functions. The system maintains a list of functions contained in each App that are accessible to other Apps, and these functions can then be initiated as required by the calling App. The list of available functions and a pointer to which App contains them is available to any App upon making a call to a Lookup function of the system. An example of an App using functions in a separate App is the inclusion of audio effects, such as low-pass, equalization, reverb, and gating among others.

Operation

In operation, each port sequences digital samples to a D/A engine which converts the digital sample to a voltage that is then filtered, amplified or attenuated as necessary for transmission to both a line level output and a microphone level output (in the case of an audio signal) or other output. Either of these outputs can then be directly connected to either an amplifier or a powered speaker which includes an amplifier or other device for non-audio applications.

Any port may be directed by the controller to output fully or partially processed streams to another Port. Ports may each partially process the entire stream of signals to provide greater system capacity/performance by increasing delay through the system.

Ports can be added to the chassis one by one for a total of all inputs and outputs required by the user. A network master recognizes each device upon initialization and directs its processing functions through control messages sent to the nodes. The network master for clock synchronization need not be the same device as the network master for node identification or IP address assignment.

Each port contains test circuitry that is used to identify the type of device plugged into the Port. After power-up, the Port begins monitoring the input connection for a load. When it recognizes that a load is attached, it tests the load values to determine the type of device to which the load corresponds. This may include microphones, speakers, line level input, line level output, or input of an amplifier, video devices, lighting devices or other devices. This information is stored and communicated to the chassis controller to be verified and confirmed by the operator.

In one embodiment, a port may operate without direct inclusion in the chassis enclosure, but from a remote location through a standard network interface connected to the switch fabric. In this case, the port may be co-located with a device or other equipment, whether it be an audio transducer, lighting equipment, synthesis equipment, or any other equipment managed through the chassis' control processor.

In addition to connection to audio/video/lighting/other equipment, a Port may include external connections to the chassis switch fabric.

In addition to a network fabric connection, the chassis includes a control processor which provides a visual interface through a network connection to an external display device. The external display device may be connected by either wired or wireless means. The control processor presents information regarding the system to the system operator, who then specifies the processing functions required for each Port.

The control processor requests information from system nodes to display in visual form to the operator. The most common use of this in an audio application is a VU meter for gain/volume controls, or an indicator for an alert, but is not limited to these functions.

The chassis control processor manages connections to external display devices. It supplies a visual or audio interface through which an operator receives system information and directs the control processor to change parameters, routing, functions and other relevant processing information. As external display devices will have different screen sizes and input methods, the control processor provides information for each device according to its capabilities. This allows the maximum level of interactive operation possible through each device.

In one embodiment, more than one external display device is included in the system; an operator modification to one control setting is reflected in all other display devices through updates from one control processor to another control processor in a different chassis. As control processors remain in sync in a larger system with more than one chassis, changes in one device will be reflected in all external device displays regardless of which chassis control processor they are attached to.

As noted above, the chassis may also be attached to an internet connection. The control processor manages this connection, and allows a remote user to receive signals from the system (for example, an audio stream, a video stream, etc.). A connection across the internet may be made with an encrypted and password-protected link or through the use of public key encryption. Through this link a remote operator can see and modify the virtual console presented by the control processor.

The control processor manages information saved to and restored from an attached permanent storage device, such as a hard drive. The attachment of the hard drive is done through either a dedicated port on the chassis, or as a Port in the backplane. The hard drive can be directed to store configuration information, device characterization, performer presets, auditorium information or any other relevant performance data. In addition, the hard drive may be directed by the control processor to store or play back audio or video streams associated with one or many Ports. These streams are typically stored in industry-standard formats for ease of access.

The control processor may also include a sequencer function used to regulate the movement and operation of a lighting system during a performance, or to direct the operation of synthesizers attached to the system, most typically through a MIDI connection. Sequences may be triggered by time, content, or by an operator.

More than one chassis can be supported in a system. Each chassis has its own control processor and multiple chassis connected together will share control information so that each control processor in each chassis has the same information. All control information, both acquired from system nodes and specified by an operator, is synchronized so that every representation in all controllers is identical. This is done by each control processor recognizing control commands sent on the network and adjusting its state accordingly. This is termed "control snooping" and is much more efficient than copying full control state continually around the system.

A control processor may request the control state of any node at any time. This will include information on processing being specified in the queried node as well as configuration and device information.

When a chassis is initialized in the system, it may obtain the control state either from a chassis control processor already in the system or individually from each node through control query commands.

Any control processor may request any Port to store information in its non-volatile memory. In particular, device information, text and graphics specified by the operator are particularly important.

Any control processor may also request storage of overall system configuration, controller state, device presets, or other information in any or all system Port(s).

Upon initialization, a control processor may query the memory contained in any Port to discover or apply previously saved configuration or device information to the present session.

If a Port fails during operation, a replacement can be substituted without initializing the entire system (hot swapping). The controller may direct the replacement node to duplicate the functions of the failing node.

Permissions

As noted above, the control processor can adjust information displayed on the control device depending on the type of device and permissions assigned by the operator. An authorized operator may restrict or allow access to system functions on a selective basis so that other operators may control the entire system or just portions of the system. Access to restricted interfaces may be password protected, encrypted, and/or restricted to particular times and dates and/or locations.

Many control devices may be attached through wired or wireless connections to the system. Each control device is connected to one console processor through this connection, and that console processor provides bidirectional information transfer between the control device and the system.

A system administrator is one or many designated user(s) who have authenticated themselves through credentials (normally a username and password) to the system. The system administrator (SA) has full permissions to modify any control or configuration in the system. The SA may authorize other users control over various devices or controls. Allowable permissions include, but are not limited to:

1. The ability to change various control settings
2. The ability to disable particular ports or other attached hardware.
3. The ability to send a message to other control devices for their user's benefit or information.
4. The ability to control ports or devices only on the chassis to which the control device is connected.
5. Valid times for all other permissions to apply.
6. Valid dates for all other permission to apply The SA may choose various levels of permission for the system. The lowest level allows anyone who connects to the system to modify any setting or control. Even if this is selected by the SA, it does not imply that a passphrase or passcode is not required to connect to the system.

Higher levels of permission may require users to authenticate with the system. Authentication is typically done by a challenge upon connection to the system for a username and password. Unauthenticated users may be denied access to the system or allowed only limited access as anonymous users.

Authenticated users may be allowed only restricted control as indicated above.

Authentication is provided by the console processor to which the control device is connected. Upon successful authentication, the console processor acquires a unique identification code (ID) from the control device, normally but not limited to a MAC address. The control ID is considered "state" and is shared between all console processors. The control ID is associated with permissions for each device or port in the system in a permission table. For instance, a particular control device (a smartphone) may be authorized to mute or unmute a particular group of microphones only between the hours of 3 PM to 7 PM on a particular date. Any combination of control permissions indicated above can be given for any control device.

Permissions given may be indicated to the user by visual or other means. A common method of indicating lack of permission is to "gray out" the control as represented on the control device.

Upon receiving a control change, the console processor determines by reference to the permission table if the control device is authorized to modify that state. If allowed, the control change is passed on as previously indicated. If not, the console processor may indicate unauthorized control change to the user, or may simply ignore the user input.

As the permission table is considered "state" and devices have unique IDs, the control device may reconnect to another chassis in the system while retaining permissions for control.

The control processor in each chassis, according to one embodiment, supplies a console interface to external devices through standard web-based protocols so that external devices with browser capabilities can be used as display and control surfaces for one or more operator. The control processor adjusts information displayed on the control device depending on the type of device and permissions assigned by the operator. An authorized operator may restrict or allow access to system functions on a selective basis so that other operators may control the entire system or just portions of the system. Access to restricted interfaces may be password protected, encrypted, and/or restricted to particular times and dates and/or locations.

Console Synchronization

A system may consist of several chassis. As each chassis has its own control processor, several control processors will be present simultaneously in the system. These processors each receive commands from a user through a control device interface, manage data connections from one port to another, and provide information to the user(s) concerning the characteristics of the data and conditions of the system, among other things.

Each control processor coordinates changes in the system with all other control processors present in the system. In addition to the "control snooping" described above, when a user changes a setting, for instance the volume of a particular channel, the change in that setting is understood by the control processor to which the control device is attached. That control processor may then send a message to all other control processors in the system indicating the change in the control setting. The other control processors then reflect this change in the user interface and control settings they are displaying to control devices connected to them respectively.

The control change message send from the control processor receiving the control change contains:

1. A code indicating which control processor is initiating the change.

2. A code indicating the control that has been changed.

3. Codes indicating the new value of the control, its characteristics, and applicability.

4. A list of devices or ports affected by the control change.

The message is encapsulated in a network packet addressed to either one or several other console processors. In a common and preferred case this is a "multicast" message to which all control processors pay attention and receive. No acknowledgement in form of another network message is required by the receiving control processor.

A control change message consists of control changes, identification of new ports attached to the system, a change in permissions allowed for control devices, or any other information required by the various control processors to accurately represent the control state to users or to coordinate processing duties among control processors.

Upon receipt of the control change message, a receiving control processor updates that information in its memory and communicates it to all control devices attached to it for user visibility. Some control change messages may require direct notification of the user with special messages. For instance, an alert indicating a fault in the system (crackle, loss of signal, etc.) may result in a pop-up on the control device. In the case of removal of permissions, the control processor may disconnect or otherwise disable changes from a control device.

In a system including multiple control processors, one control processor will periodically generate a signature or hash code of all or some system information or state. The control processor then sends a signature verification message to all other control processors that includes:

1. A code indicating the control processor sending the message

2. The signature or hash code value.

3. A timestamp indicating when the signature calculation was done.

4. Codes with other relevant system information, such as number of controls, ports or inputs.

Upon receipt of a signature verification message, each control processor determines whether any change has occurred since the timestamp in the verification message. If not change has occurred, each processor calculated their own signature or hash code from what is supposed to be duplicated information.

If the receiving control processor finds that a change has occurred since the indicated timestamp, it sends a message back to the initiating control processor with a code indicating that its information is out of date. The initiating processor recalculates the signature and tries again until acknowledgement of success is found.

If the receiving processor finds that the no control change has occurred since the timestamp in the signature verification message, it calculates a signature of its state and compares the received and generated signatures. If the signatures are not equal, the receiving processor sends a message requesting a full state update from the initiating processor. This message consists of:

1. A code indicating the control processor sending the message

2. A code indicating that the state information does not match and requesting a full state update from the initiating processor.

3. A timestamp for the message.

4. Codes with other relevant system information, such as number of controls, ports or inputs.

When a state update message is received by the initiating processor, it sends a state update message to the requesting control processor that contains:

1. A code indicating the control processor sending the message

2. A code indicating that this message is state update message.

3. A timestamp indicating when the message was generated.

4. A list of all state variables, their values and characteristics required by the receiving processor to update its state correctly.

A state update is also done from a designated master console to other consoles that have just become attached to the system.

Using the system, sophisticated control of audio/visual, lighting, music and the like may be effected.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A modular and scalable digital multimedia platform system for control and/or operation of plural media devices, comprising:

plural control units comprising a backplane and control processor, ones of said plural control units interfacing with plural port devices operable with said control processors and said media devices to provide an interface between said control processors and said media devices;

wherein any of said port devices are adapted to be controlled by one or more of said control processors to output processed data streams to any other port device, comprising synchronization processing for synchronizing operation of said plural control units with one another, wherein said synchronization processing comprises monitoring a sample queue depth of a port device supplying data and making fine adjustments to a sampling rate for the port device to maintain a predetermined queue depth.

2. The modular and scalable digital multimedia platform according to claim 1, further comprising permissions processing for providing control and access that an individual user or control unit may effect on one or more of said plural media devices.

3. The modular and scalable digital multimedia platform according to claim 1, wherein any one of said port devices are adapted to receive control information from said control processors to enable any of said ports devices to initiate transmitting or receiving fully or partially processed data streams between said one port device and any other port device.

4. The modular and scalable digital multimedia platform according to claim 1, wherein said control processor function may be executed on a microprocessor in any or all said port devices.

5. The modular and scalable digital multimedia platform according to claim currently amended 1, wherein control information is shared and synchronized between plural ones of said plural control processors such that control information on different control processors is duplicated.

6. The modular and scalable digital multimedia platform according to claim 2, wherein any user may be granted or restricted permissions to change any or all control information retained by a control processor.

7. The modular and scalable digital multimedia platform according to claim 2, wherein any user may be granted or restricted permissions to change any or all control information for any input or output of the system.

8. The modular and scalable digital multimedia platform according to claim 2, wherein permission to change control information by any user is granted or restricted by a system administrator.

9. The modular and scalable digital multimedia platform according to claim 8, wherein said permission to change control information may be granted within restricted dates and times as determined by the system administrator.

10. The modular and scalable digital multimedia platform according to claim 2, wherein a system administrator may grant or restrict access to information received from or allowed to any port device.

11. A modular and scalable digital multimedia platform system for control and/or operation of plural media devices, comprising:

plural control units comprising a backplane and control processor, ones of said plural control units interfacing with plural port devices operable with said control processors and said media devices to provide an interface between said control processors and said media devices;

wherein any of said port devices are adapted to be controlled by one or more of said control processors to output processed data streams to any other port device, further comprising a tag device for removable connection to one of said plural media device devices to provide a unique identification of the associated connected media device, wherein said tag device comprises:

a processor with associated memory; and a modulator/demodulator receiver for transmitting and receiving information between the tag device and a port device.

12. The modular and scalable digital multimedia platform according to claim 11, wherein said tag device transmits/receives a data signal imposed on signals to/from said connected media device.

13. The modular and scalable digital multimedia platform according to claim 12, wherein said modulator/demodulator receiver transmits and receives information at a frequency above audio spectrum frequencies across a microphone or speaker cable.

14. The modular and scalable digital multimedia platform according to claim 11, wherein said modulator/demodulator receiver is powered by phantom power.

15. The modular and scalable digital multimedia platform according to claim 11, wherein said media devices comprise at least one microphone.

16. The modular and scalable digital multimedia platform according to claim 11, wherein said media devices comprise at least one input of an amplifier.

17. A modular and scalable digital multimedia platform system for control and/or operation of plural media devices, comprising:

plural control units comprising a backplane and control processor, ones of said plural control units interfacing with plural port devices operable with said control processors and said media devices to provide an interface between said control processors and said media devices;

wherein any of said port devices are adapted to be controlled by one or more of said control processors to output processed data streams to any other port device, comprising synchronization processing for synchronizing operation of said plural control units with one another, wherein said synchronization processing comprises calculating a number of samples transmitted over a period of time, and adjusting a sampling rate to reach a predetermined rate as calculated by the number of samples per period of time.

18. A modular and scalable digital multimedia platform system for control and/or operation of plural media devices, comprising:

plural control units comprising a backplane and control processor, ones of said plural control units interfacing with plural port devices operable with said control processors and said media devices to provide an interface between said control processors and said media devices;

wherein said media devices comprise devices selected from at least one microphone and at least one input of an amplifier;

wherein any of said port devices are adapted to be controlled by one or more of said control processors to output processed data streams to any other port device, further comprising permissions processing for providing control and access that an individual user or control unit may effect on one or more of said plural media devices, further comprising a tag device for removable connection to one of said plural media devices to provide a unique identification of the connected media device, wherein said tag device comprises:

a processor with associated memory; and a modulator/demodulator receiver for transmitting and receiving information between the tag device and a port device, wherein said tag device transmits/receives a data signal imposed on signals to/from said connected media device, further comprising synchronization processing for synchronizing operation of said plural control units with one another.

19. The modular and scalable digital multimedia platform according to according to claim 18, wherein said synchronization processing comprises monitoring a sample queue depth of a port device supplying data and making fine adjustments to a sampling rate for the port device to maintain a predetermined queue depth.

20. The modular and scalable digital multimedia platform according to claim 18, comprising synchronization processing for synchronizing operation of said plural control units with one another, wherein said synchronization processing comprises calculating a number of samples transmitted over a period of time, and adjusting a sampling rate to reach a predetermined rate as calculated by the number of samples per period of time.

21. The modular and scalable digital multimedia platform according to claim 18, wherein any user may be granted or restricted permissions to change any or all control information retained by a control processor.

22. The modular and scalable digital multimedia platform according to claim 18, wherein permission to change control information by any user is granted or restricted by a system administrator and may be based on dates and times as determined by the system administrator.

23. The modular and scalable digital multimedia platform according to claim 18, wherein a system administrator may grant or restrict access to information received from or allowed to any port device.

* * * * *